US010033975B2

(12) United States Patent
Lim et al.

(10) Patent No.: US 10,033,975 B2
(45) Date of Patent: Jul. 24, 2018

(54) SCANNING PROJECTOR AND METHOD FOR OPERATING A SCANNING PROJECTOR

(71) Applicant: LG ELECTRONICS INC., Seoul (KR)

(72) Inventors: Jaehyuk Lim, Seoul (KR); Jaewook Kwon, Seoul (KR); Woojae Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 222 days.

(21) Appl. No.: 15/049,689

(22) Filed: Feb. 22, 2016

(65) Prior Publication Data

US 2016/0366377 A1 Dec. 15, 2016

(30) Foreign Application Priority Data

Jun. 11, 2015 (KR) ........................ 10-2015-0082356

(51) Int. Cl.
*H04N 9/31* (2006.01)
*G03B 21/14* (2006.01)
(Continued)

(52) U.S. Cl.
CPC ....... *H04N 9/3135* (2013.01); *G02B 26/0833* (2013.01); *G02B 26/101* (2013.01);
(Continued)

(58) Field of Classification Search
CPC .. H04N 9/3138; H04N 9/3161; H04N 9/3164; H04N 9/3135; H04N 9/3129; G02B 26/123; G02B 26/101; G02B 26/0833; G03B 21/142033; G03B 21/2013; G03B 21/206; G03B 21/2053; G03B 21/003
(Continued)

(56) References Cited

U.S. PATENT DOCUMENTS 8,511,838 B2 * 8/2013 Rothaar ............. G03B 21/2033 349/8
8,810,561 B2 * 8/2014 Champion ........... G02B 27/104 345/204
(Continued)

FOREIGN PATENT DOCUMENTS

KR 10-2008-0025831 A 3/2008
KR 10-2012-0036849 A 4/2012
KR 10-2013-0111239 A 10/2013

OTHER PUBLICATIONS

Korean Office Action issued in Application No. 10-2015-0082356 dated Dec. 11, 2015.

*Primary Examiner* — William C Dowling
(74) *Attorney, Agent, or Firm* — KED & Associates, LLP

(57) ABSTRACT

A scanning projector and a method for operating a scanning projector including a light source module including a plurality of color light sources including at least one color light source provided in a plurality, and a scanner configured to execute scanning in the horizontal direction and the vertical direction using light beams emitted from the light source module. Light beams emitted from the plurality of same color light sources are projected on different positions on a screen within one frame and, thus, more rapid and effective scanning may be executed and a high-quality image may be formed.

17 Claims, 17 Drawing Sheets

(51) Int. Cl.
*G02B 26/12* (2006.01)
*G03B 21/20* (2006.01)
*G02B 26/08* (2006.01)
*G02B 26/10* (2006.01)

(52) U.S. Cl.
CPC ....... *G02B 26/123* (2013.01); *G03B 21/2033* (2013.01); *H04N 9/3129* (2013.01); *H04N 9/3164* (2013.01)

(58) Field of Classification Search
USPC ........................................... 359/204.1, 204.4
See application file for complete search history.

(56) References Cited

U.S. PATENT DOCUMENTS

2006/0238660 A1* 10/2006 Takeda ............... G03B 21/2033 348/801
2016/0073071 A1* 3/2016 Nagashima ........ G02B 27/0101 353/121
2017/0237880 A1* 8/2017 Saracco .................. H04N 3/28 348/757

* cited by examiner (a)

(b)

(c)

SCANNING PROJECTOR AND METHOD FOR OPERATING A SCANNING PROJECTOR

CROSS-REFERENCE TO RELATED APPLICATION

This application claims the benefit of Korean Patent Application No. 10-2015-0082356, filed on Jun. 11, 2015 in the Korean Intellectual Property Office, the disclosure of which is incorporated herein by reference.

BACKGROUND

1. Field

The present disclosure relates to a scanning projector and a method for operating a scanning projector and, more particularly, to a scanning projector which may improve image quality and a method for operating a scanning projector.

2. Background

Recently, as larger volumes of high quality multimedia contents increases, display screens having a large size and a high definition have been required. Among display devices, a projector is a device for projecting an image and may be used to give a presentation in a conference room to show a film in a movie theater or to produce a home theater.

A scanning projector generates an image by executing light scanning of a screen using a scanner and has advantages, such as easy formation of a large-sized image as compared to other display devices. The scanning projector projects light generated from a light source on the screen using the scanner and may thus require effective and accurate scanning in generation of an image. As such, research on scanning projectors that may execute rapid and accurate scanning to improve image quality has increased.

BRIEF DESCRIPTION OF THE DRAWINGS

The embodiments will be described in detail with reference to the following drawings in which like reference numerals refer to like elements, wherein.

DETAILED DESCRIPTION

Figure 1:
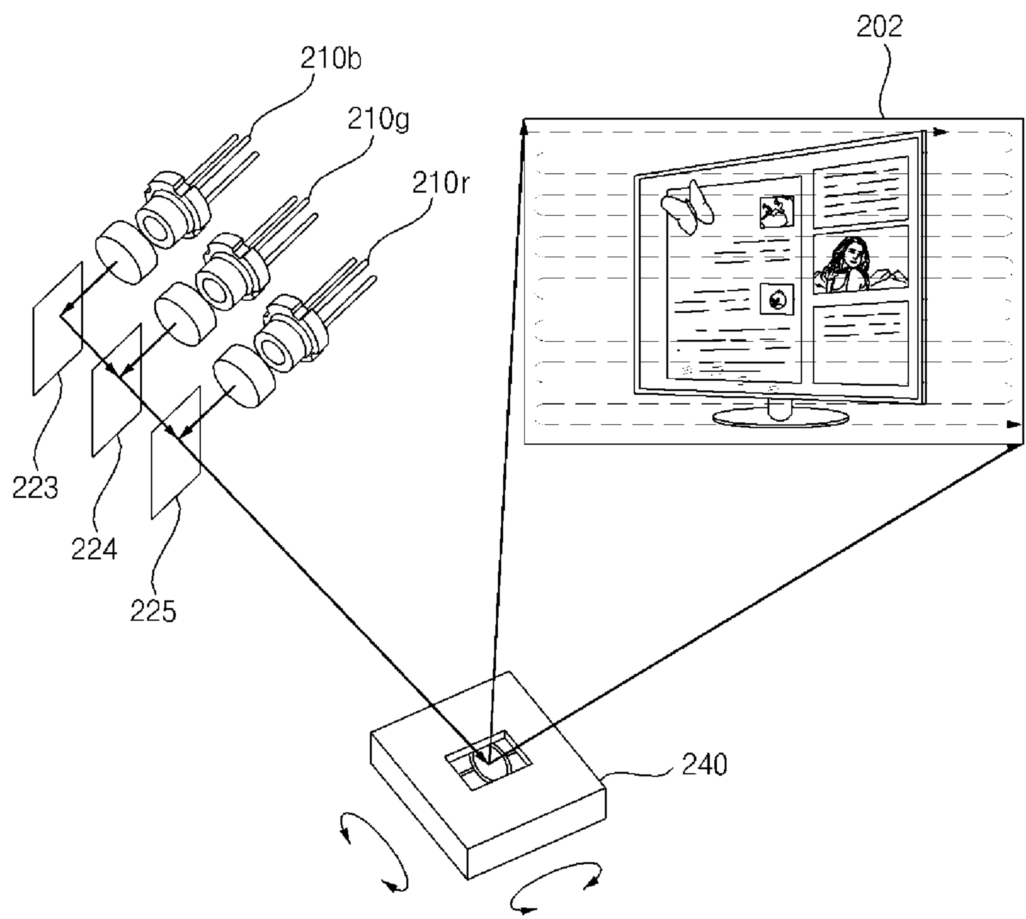
FIG. 1 is a view illustrating a scanning projector.

FIG. 1 is a view illustrating a scanning projector in accordance with one embodiment. With reference to FIG. 1, a scanner 240 within a scanning projector 100 may sequentially and repeatedly execute scanning in a first direction and scanning in a second direction using input light, and output light to an external scan area. The scanning projector 100 may include a plurality of light sources 210*r* (e.g., red), 210*g* (e.g., green) and 210*b* (e.g., blue), a light reflection unit (or light reflector) 223, light wavelength separation units (or light wavelength separator) 224 and 225, and the scanner 240.

In the case of the light sources 210*r*, 210*g* and 210*b*, light collimation is important to project light on an external object. For this purpose, the light sources 210*r*, 210*g* and 210*b* may employ laser diodes, without being limited thereto. The light sources 210*r*, 210*g* and 210*b* may include a blue laser diode 210*b* to output a single wavelength of blue light, a green laser diode 210*g* to output a single wavelength of green light, and a red laser diode 210*r* to output a single wavelength of red light.

FIG. 1 illustrates that the blue laser diode 210*b* to output blue light with a short wavelength is arranged farthest from the scanner 240 and the green laser diode 210*g* and the red laser diode 210*r* are sequentially arranged from the blue laser diode 210*b* toward the scanner 240. The scanning projector 100 may include three light sources 210*r*, 210*g* and 210*b*, as exemplarily shown in FIG. 1, or include various numbers of light sources. Further, the arrangement sequence and positions of the light sources and optical parts may vary according to design.

For example, light output from a designated light source 210*b* may be reflected by the light reflection unit 223, transmitted by the light wavelength separation unit 224 and received by the scanner 240. Light output from a designated light source 210*g* may be reflected by the light wavelength separation unit 224, transmitted by the light wavelength separation unit 225 and received by the scanner 240. Light output from a designated light source 210*r* may be reflected by the light wavelength separation unit 225 and received by the scanner 240.

The light wavelength separation units 224 and 225 may reflect or transmit light according to light wavelengths and, for example, be dichroic mirrors. If the wavelength of light output from one light source is shorter than the wavelength of light output from another light source, the light wavelength separation units 224 and 225 may transmit the light having the shorter wavelength and reflect the light having the longer wavelength.

The scanner 240 may receive light output from the light sources 210*r*, 210*g* and 210*b* and sequentially and repeatedly execute scanning in the first direction and scanning in the second direction to the outside. The scanner 240 may receive light beams combined by light combining units (or light combiner) and project the light beams in the first direction and the second direction which may be a horizontal direction and a vertical direction. For example, the scanner 240 may project the combined light beams on a first line in the horizontal direction (scanning in the horizontal direction) and vertically move a second line under the first line (scanning in the vertical direction). Thereafter, the scanner 240 may project the combined light beams on the second line in the horizontal direction (scanning in the horizontal direction). Through such a method, the scanner 240 may project an image to be displayed on the entirety of a screen 202.

As shown in the drawings, the scanner 240 may execute scanning in the horizontal direction from left to right of an area in which scanning is executable. The scanner 240 may also execute scanning in the vertical direction from top to bottom, execute scanning in the horizontal direction from right to left, and execute scanning in the vertical direction from bottom to top. Further, the scanner 240 may repeatedly execute such scanning operations on the entirety of a projection area.

Figure 2:
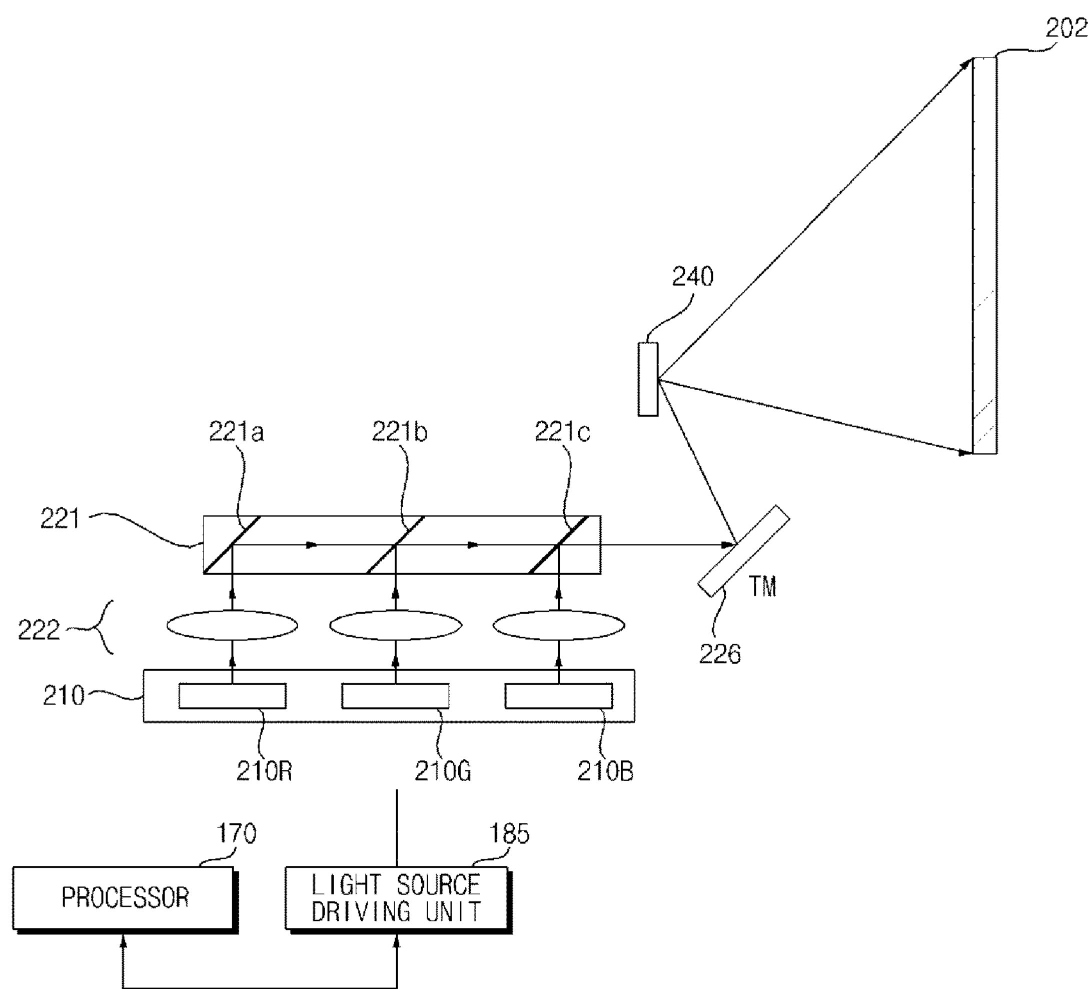
FIG. 2 is a view illustrating the inner structure of the scanning projector.

With reference to FIG. 2, the scanning projector 100 may include a light source unit (or a light source) 210 including a plurality of light sources. The scanning projector 100 may include a red light source 210R, a green light source 210G and a blue light source 2106. The light sources 210R, 210G and 2106 may include laser diodes.

The respective light sources 210R, 210G and 210B may be driven by an electrical signal from a light source driving unit (or driver) 185 and such an electrical signal from the light source driving unit 185 may be generated under control of a processor 170. Light output from the light source unit 210 may be transmitted to the light scanner 240 via an optical system. Light beams output from the respective light sources 210R, 210G and 210B may be collimated through collimating lenses within a light collimating unit (or a light collimator) 222.

The light combining units 221 may combine light beams emitted from the respective light sources 210R, 210G and 210B and output the combined light beams in one direction. For this purpose, the light combining units 221 may include a designated number of filters or mirrors 221*a*, 221*b* and 221*c*.

For example, a first light combining unit or device 221*a*, a second light combining unit or device 221*b* and a third light combining unit or device 221*c* may respectively direct red light from the red light source 210R, green light from the green light source 210G and blue light from the blue light source 210B, the direction of the scanner 240. A light reflection unit (or a light reflector) 226 may reflect red light, green light and blue light, having passed through the light combining units 221, in the direction of the scanner 240. The light reflection unit 226 may reflect light of various wavelengths and may thus include a total mirror (TM).

The scanner 240 may receive visible light (red, green and blue light) from the light source unit 210 and sequentially and repeatedly execute scanning in the first direction and scanning in the second direction to the outside. Such scanning operations may be repeatedly executed with respect to the entirety of an external scan area. Particularly, visible light (red, green and blue light) output from the scanner 240 may be output to a projection area of a screen 202. In accordance with one embodiment, although the screen 202 on which a projection image is displayed has a free-form surface, the scanning projector 100 may display the projection image corresponding to the free-form surface of the corresponding screen 202.

With reference to FIG. 2, the processor 170 may control the overall operation of the scanning projector 100. In more detail, the processor 170 may control operation of the respective units in the scanning projector 100. The processor 170 may control a video image received from the outside so as to be output as a projection image to an external scan area. For this purpose, the processor 170 may control the light source driving unit 185, which controls the light source unit 210 to output visible light, such as R, G and B light. The processor 170 may output R, G and B signals, corresponding to a video image to be displayed, to the light source driving unit 185.

The processor 170 may control operation of the scanner 240. The processor 170 may control the scanner 240 to sequentially and repeatedly execute scanning in the first direction and scanning in the second direction, and to then output light to the outside.

The light source unit 210 may include the blue light source 210B to output a single wavelength of blue light, the green light source 210G to output a single wavelength of green light, and the red light source 210R to output a single wavelength of red light. The respective light sources 210B, 210G and 210R may be laser diodes or LEDs. The light source driving unit 185 may control the red light source 210R, the green light source 210G and the blue light source 210B corresponding to R, G and B signals received from the processor 170 so as to respectively output red light, green light and blue light.

Figure 3:
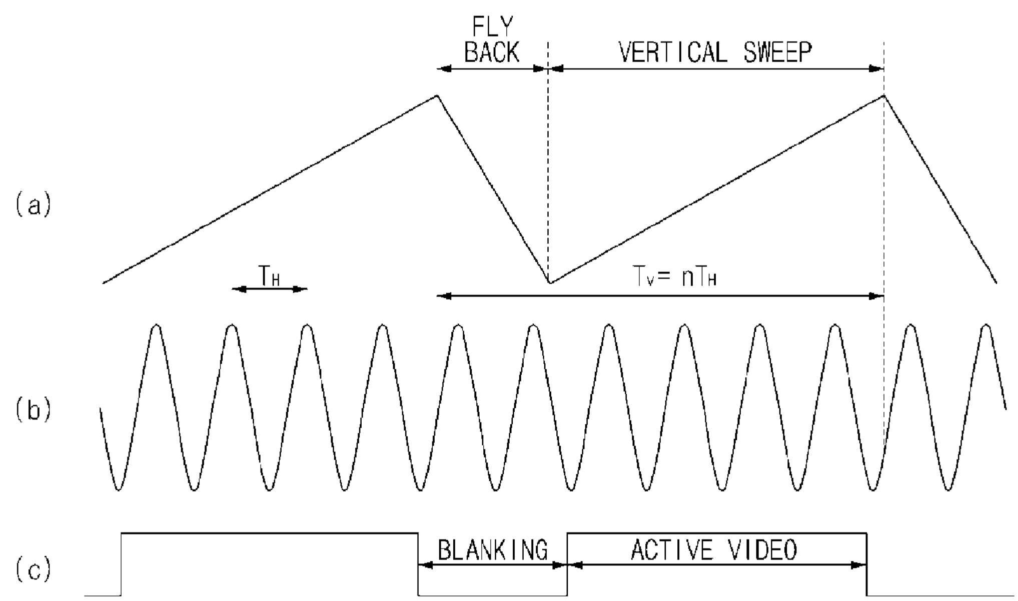
FIG. 3 illustrates driving signal waveforms of the scanning projector.
Figure 4:
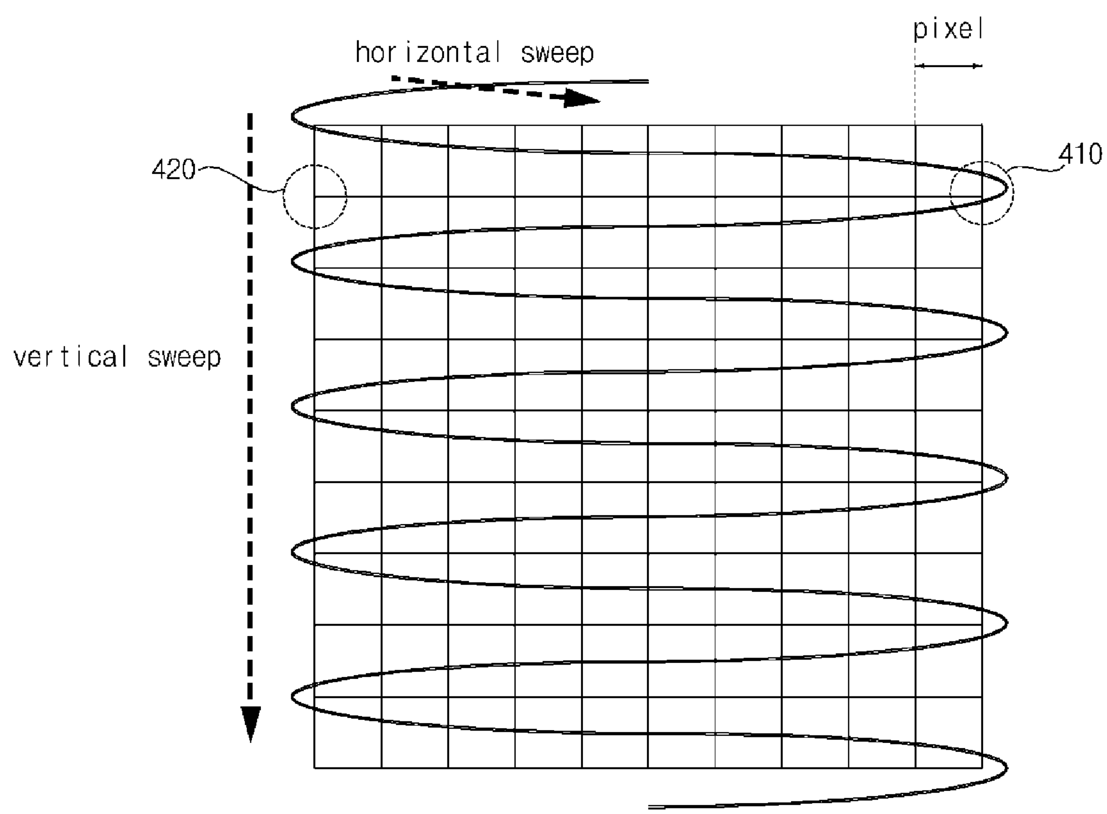
FIG. 4 is a view illustrating vertical sweep and horizontal sweep of a scanner according to driving signal waveforms of FIGS. 3(*a*) to 3(*c*)

FIGS. 3(*a*) to 8 are reference views to describe methods for operating the scanning projector. FIGS. 3(*a*) to 3(*c*) are views illustrating driving signal waveforms of the scanning projector and FIG. 4 is a view illustrating vertical sweep and horizontal sweep of the scanner according to driving signal waveforms of FIGS. 3(*a*) to 3(*c*).

With reference to FIGS. 3(*a*) to 4, the scanner may execute sweep in the horizontal and vertical directions according to driving signal waveforms, as well as image scanning starting from an initial pixel position to a final pixel position, and then repeat such scanning. The scanner may be operated in a ramp waveform, for example, a sawtooth waveform, in the vertical direction and a sinusoidal waveform in the horizontal direction.

FIG. 3(*a*) illustrates a vertical sawtooth waveform having a vertical period TV and FIG. 3(*b*) illustrates a horizontal sinusoidal waveform having a horizontal period TH. FIG. 3(*c*) illustrates an active video section in which an image is scanned and a blanking section in which no image is displayed.

The scanner may execute linear sweep in the vertical direction while scanning an image along the vertical sawtooth waveform having the vertical period TV. The scanner may execute sweep in the vertical direction (for example, from top to bottom) during a vertical sweep period, return to the initial pixel position during a fly back period, and then start scanning of a new image. Further, the scanner may execute sinusoidal sweep in the horizontal direction at a sweep frequency (1/TH) while scanning an image, along the sinusoidal waveform having the horizontal period TH. The vertical sweep period is an active video section in which an image is scanned and, during such a vertical sweep period, the light sources may be turned on so as to form the image.

The fly back period may be the blanking section in which no image is displayed and, during such a fly back period, the light sources may be turned off. In the case of such operation of the scanner, beams may not be uniformly projected on pixels and a region 410 in which the scanning beams are densely disposed between the pixels and a region 420 in which the scanning beams are sparsely disposed between the pixels may occur. Therefore, such a phenomenon may cause degradation of the quality of a formed image.

Figure 5:
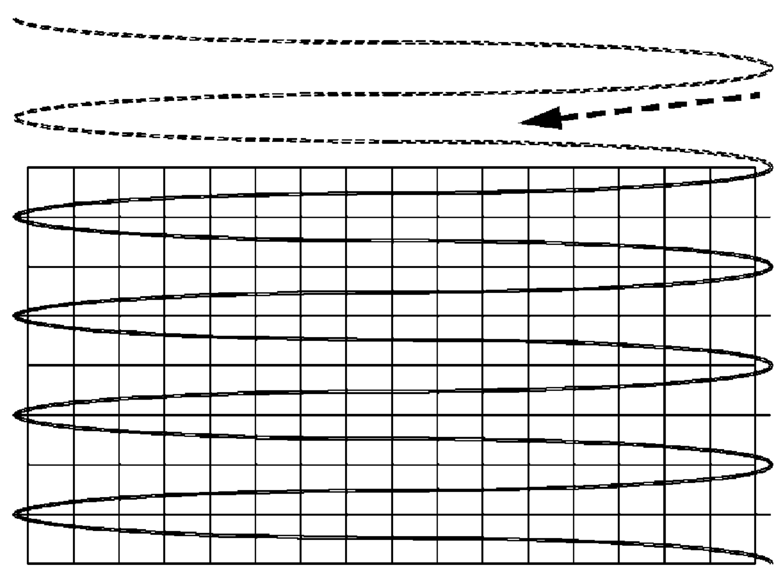
FIGS. 5 and 6 are views illustrating vertical sweep and horizontal sweep of the scanner on continuous frames.
Figure 6:
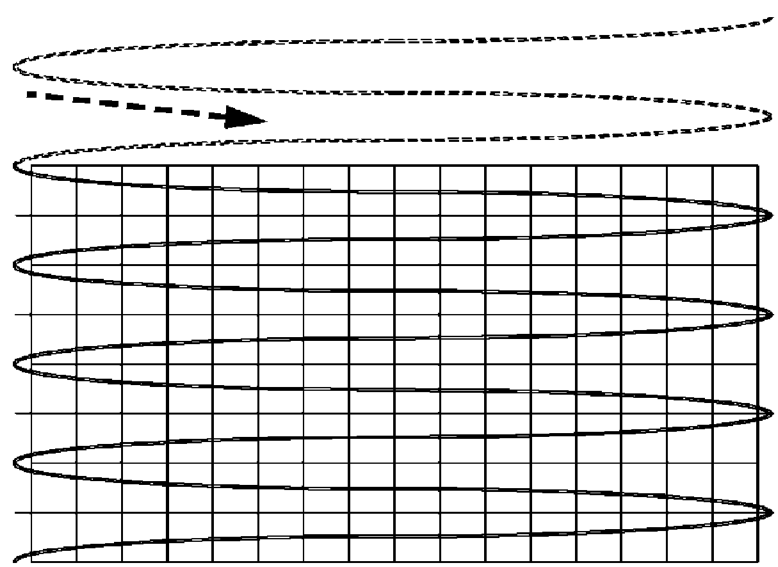
Figure 7:
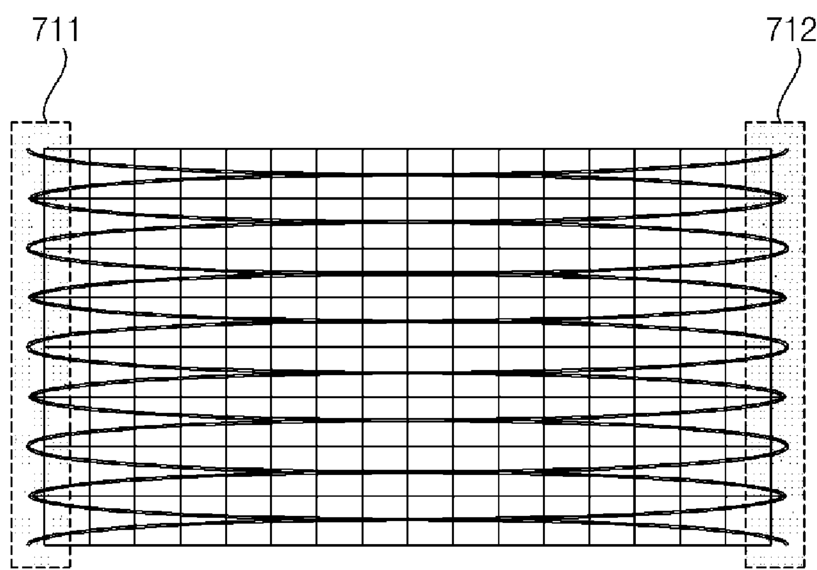
FIG. 7 is a view illustrating combination of the vertical sweep and horizontal sweep of the scanner of FIGS. 5 and 6.
Figure 8:
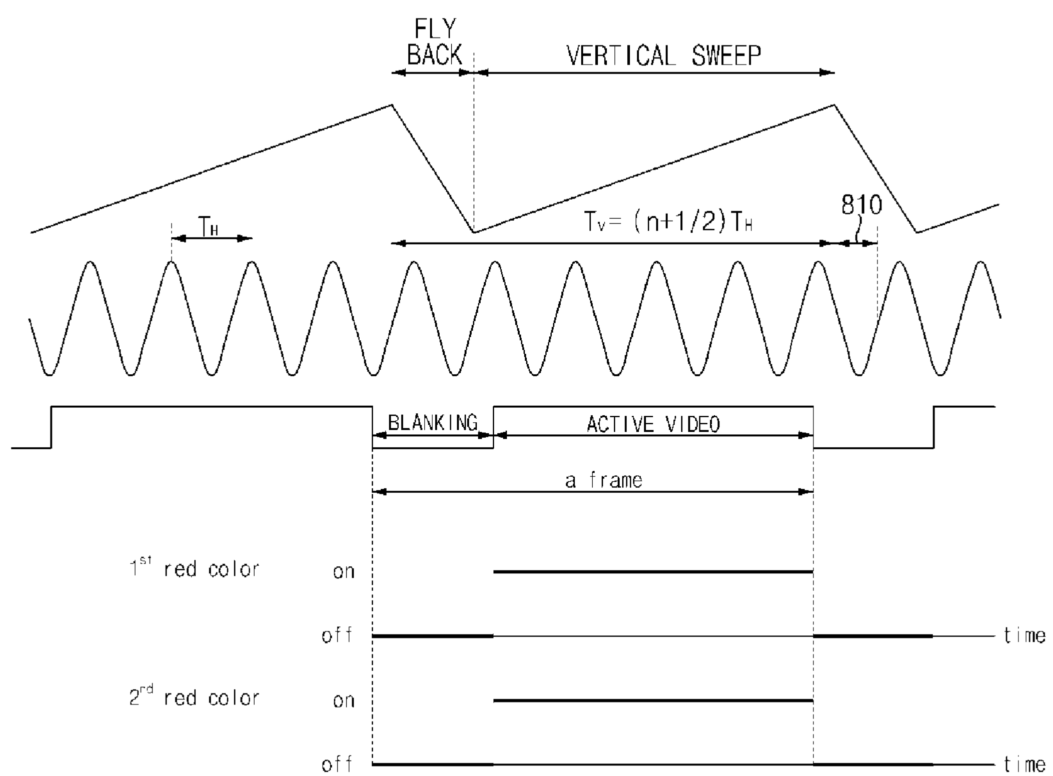
FIG. 8 is a view illustrating driving signal waveforms of the scanning projector.

FIGS. 5 to 8 are reference views to illustrate one method for operating the scanning projector. FIGS. 5 and 6 are views illustrating vertical sweep and horizontal sweep of the scanner on continuous frames, and FIG. 7 is a view illustrating a combination of the vertical sweep and horizontal sweep of the scanner of FIGS. 5 and 6. FIG. 8 is a view illustrating driving signal waveforms of the scanning projector.

The scanning projector may be operated using a progressive scanning method, in which scan lines forming one screen are sequentially scanned for a designated time, as described above. That is, in the progressive scanning method, among all scan lines on a screen, odd-numbered scan lines and even-numbered scan lines are alternately scanned. For example, the odd-numbered scan lines may be scanned from left to right and the even-numbered scan lines may be scanned from right to left.

However, in the case of such a progressive scanning method, as shown in FIG. 1, intervals between the scan lines may not be uniform. As described above with reference to FIG. 4, a region 410 in which the scanning beams are densely disposed between the pixels and a region 420 in which the scanning beams are sparsely disposed between the pixels may occur and, due to non-uniformity in scanning, image quality, such as pixel resolution, may be lowered.

FIGS. 5 to 8 are reference views to illustrate one method for operating the scanning projector, in order to prevent occurrence of the region 410 in which the scanning beams are densely disposed between the pixels and the region 420 in which the scanning beams are sparsely disposed between the pixels.

In a first frame, odd-numbered scan lines may be scanned from right to left and even-numbered scan lines may be scanned from left to right, as shown in FIG. 5. In a second frame, odd-numbered scan lines may be scanned from left to right and even-numbered scan lines may be scanned from right to left, as shown in FIG. 6. In the alternative, in the first frame, the odd-numbered scan lines may be scanned from left to right and even-numbered scan lines may be scanned from right to left and, in the second frame, the odd-numbered scan lines may be scanned from right to left and the even-numbered scan lines may be scanned from left to right.

Further, as shown in FIG. 7, the horizontal sweeping directions opposite each other between continuous frames shown in FIGS. 5 and 6 may be combined, thereby executing uniform beam scanning. Odd-numbered frames may be swept through the method shown in FIG. 5, even-numbered frames may be swept through the method shown in FIG. 6 and scanning trajectories of two continuous frames may be combined. The odd-numbered frames may also be swept through the method shown in FIG. 6 and the even-numbered frames may be swept through the method shown in FIG. 5.

However, with reference to FIG. 7, images of both ends 711 and 712 of the screen may be repeatedly turned on/off, thus flickering or flowing down. That is, if one frame is swept through the method shown in FIG. 5 and the next frame is swept through the method shown in FIG. 6, the pixels of both ends 711 and 712 of the screen are turned on in the former frame and turned off during the latter frame. Thereby, the images of both ends 711 and 712 of the screen appear to flicker or flow down due to repetition of turning-on/off.

In order to execute uniform scanning, two continuous frames are used. In this case, processing speed and resolution may be lowered, as compared to when one frame is used. In the scanning method shown in FIGS. 5 to 8, in order to execute uniform scanning between pixels, continuous frames are scanned in different directions using phase offset.

With reference to FIG. 8, by applying phase offset of 180 degrees to continuous frames, horizontal waveform phase offset 810 between a first frame and a second frame may be confirmed. That is, if no phase offset is applied, a horizontal waveform in the first frame is repeated in the second frame without the gap 810. However, if phase offset is given, as shown in FIG. 8, a start position of the horizontal waveform in the second frame may be located at a region with the gap 810 corresponding to the phase offset. Through comparison between FIGS. 3(*a*) to 3(*c*) and FIG. 8, it may be confirmed that relations between the vertical period TV and the horizontal period TH are changed by phase offset. With reference to FIG. 8, if a plurality of same color sources is used, these light sources may be controlled so as to have the same on/off timing.

Figure 9:
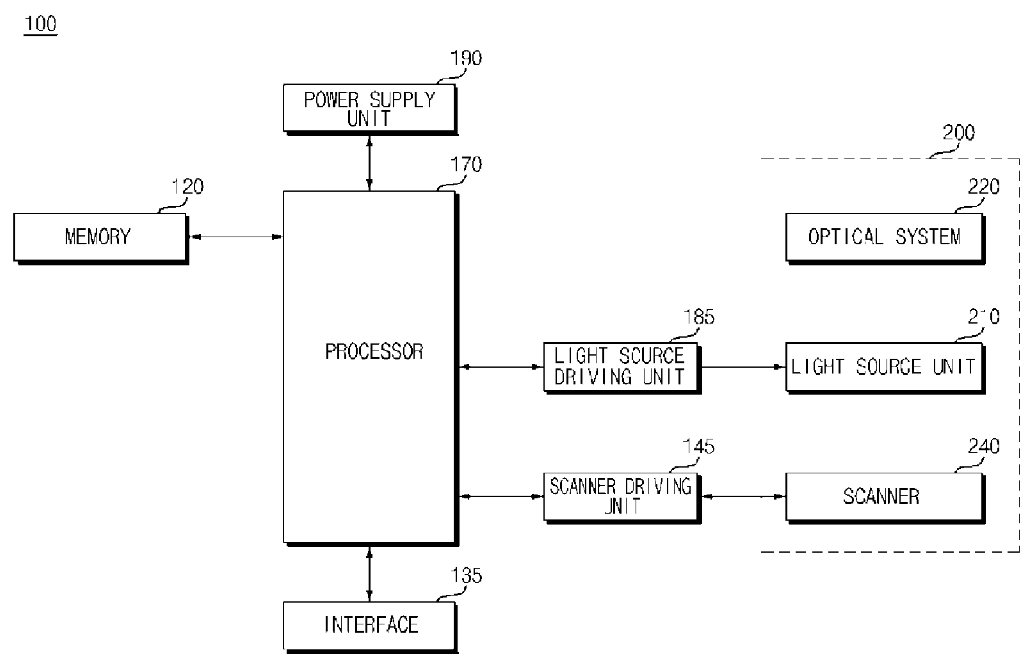
FIG. 9 is a brief inner block diagram of a scanning projector in accordance with one embodiment.

FIG. 9 is a brief inner block diagram of a scanning projector in accordance with one embodiment of the present invention. A scanning projector 100 in accordance with one embodiment may include a light source unit or module 210 including a plurality of color light sources including at least one color light source which is two or more in number, and a scanner 240 to execute scanning in the horizontal direction and scanning in the vertical direction using light output from the light source unit 210. The scanning projector 100 may further include an optical system 220 to combine light beams output from the light source unit 210. Particularly, the light beams output from the light source unit 210 may be combined by light combining units or devices within the optical system 220.

With reference to FIG. 9, the scanning projector 100 may include an optical engine 200. For example, the optical engine 200 may include the light source unit 210, the optical system 220 and the scanner 240. The optical engine 200 may include a plurality of laser light sources to emit laser beams, collimating lenses to collimate the emitted laser beams, the light combining units to combine the emitted laser beams (for example, filters), and the MEMS scanner 240 to project an image on a screen.

With reference to FIG. 9, the scanning projector 100 may include the light source unit 210 including a plurality of light sources. The light source unit 210 may include a red light source, a green light source, and a blue light source. The light source unit 210 may include laser diodes to emit light of different colors.

The scanning projector 100 in accordance with an embodiment includes a plurality of color light sources, and at least one of the color light sources may be provided in two or more in number. That is, the light source unit 210 may include at least two same color light sources. For example, the light source unit 210 may include two red laser diodes, two green laser diodes and one blue laser diode. Otherwise, the light source unit 210 may include two red laser diodes, two green laser diodes and two blue laser diodes.

Light beams output from the at least two same color light sources may be projected on different positions of a screen within the same frame. The light source unit 210 may include a first light source including a plurality of color light sources and a second light source including at least one color light source which is the same as at least one of the color light sources. In this case, light beams output from the first light source and light beams output from the second light source may be projected on different positions of the screen within the same frame.

The two or more same color light sources may be aligned such that projected light beams are parallel with each other. Particularly, the two or more same color light sources may be aligned such that light beams projected on the screen may differ from each other by 1 pixel. That is, laser diodes that emit light of the same color may be provided such that first and second laser diodes output light beams in parallel and the second laser diode executes scanning along a trajectory being parallel with at least a partial section of the scanning trajectory of the first laser diode. Exemplary configurations of the light source unit 210 will be described later with reference to FIGS. 11(*a*) to 11(*c*).

The respective light sources of the light source unit 210 may be driven by an electrical signal from the light source driving unit 185 and such an electrical signal from the light source driving unit 185 may be generated under control of the processor 170. Light beams output from the light source unit 210 may be transmitted to the scanner 240 via the optical system 220. The optical system 220 may include various optical parts. The optical system 220 may include optical parts, such as filters, mirrors or lenses, so as to form an image of an object using reflection or refraction of light.

Light beams output from the respective light sources of the light source unit 210 may be collimated through the optical system 220, particularly, respective collimating lenses within a collimation unit or module. That is, the scanning projector 100 in accordance with the embodiment may further include collimating lenses provided in front of the light source unit 210 to convert light beams output from the light source 210 into parallel light beams. The number of the collimating lenses may correspond to the number of the respective light sources.

The collimating lenses may be provided such that projected light beams differ from each other by 1 pixel on the screen. Particularly, among the collimating lenses, collimating lenses corresponding to the two or more same color light sources may be aligned such that projected light beams are parallel with each other. The collimating lenses output the light beams along the same trajectory in at least a partial region.

The collimating lenses corresponding to the same color light sources may be provided such that the laser diodes to emit light of the same color output beams in parallel. The collimating lenses corresponding to the same color light sources may be provided such that a first laser diode executes scanning along a trajectory being parallel with at least a partial section of the scanning trajectory of a second laser diode, a first laser diode executes scanning. Further, the collimating lenses corresponding to the two or more same color light sources may be aligned such that projected light beams differ from each other by 1 pixel on the screen.

According to embodiments, among the two or more same color light sources, one light source may be turned on and off earlier than the remaining light sources. Among the two or more same color light sources, turning-on/off of one light source may be delayed as compared to the remaining color light sources. If the same color light sources are simultaneously turned on, light beams emitted from at least one light source may be projected on an area other than the projection area and it may be difficult to execute scanning on the projection area in which an image will be displayed at the same time. Therefore, by adjusting on/off timing of at least one light source, power consumption may be reduced and more accurate scanning operation may be carried out.

In order to raise strength and uniformity of light beams dispersed from the light source unit 210, the light beams may be converted into parallel light beams. Therefore, the collimating lenses 222 may be provided in front of the light source unit 210 to convert light beams emitted from the light source unit 210 into parallel light beams.

The light combining units of the optical system 220 combine light beams emitted from the respective light sources of the light source unit 210 and output the combined light beams in one direction. For this purpose, the light combining units may include filters and/or mirrors of a designated number. For example, the light combining units may include optical parts, such as filters, lenses, mirrors and the like, may be properly positioned to combine light beams, and may include light combining units corresponding to the respective light of different colors. Specifically, a first light combining unit, a second light combining unit, and a third light combining unit may output red light emitted from the red light source(s), green light emitted from the green light source(s), and blue light emitted from the blue light source (s) in the direction of the scanner 240.

In the alternative, the light combining units may correspond to the respective light sources. For example, if the light source unit 210 includes two red laser diodes, two green laser diodes, and two blue laser diodes, the light combining units may include first to sixth light combining units corresponding to the respective laser diodes. Each of the respective light combining units may include at least one optical part and a group of the optical parts may be commonly called the light combining unit.

The light reflection unit of the optical system 220 reflects red light, green light and blue light, having passed through the light combining units, in the direction of the scanner 240. The light reflection unit reflects light of various wavelengths and may thus include a total mirror (TM). Optical parts, such as filters, mirrors, or lenses, which form the image of an object using reflection or refraction of light may be commonly called the optical system 220.

The scanner 240 may receive visible light (R, G and B light) from the light source unit 210 and sequentially and repeatedly execute scanning in the first direction and scanning in the second direction to the outside. The scanner 240 may repeatedly execute such scanning operations on the entirety of an outside scan area. Particularly, visible light (red, green and blue light) output from the scanner 240 may be output to a projection area of the screen 202.

Light beams output from the two or more same color light sources may be reflected by different positions of the scanner 240 within a frame. The scanner 240 may equally execute scanning of continuous frames using light beams emitted from the light source unit 210. In accordance with the embodiment, although the screen 202 on which a projection image is displayed has a free-form surface, the scanning projector 100 may display the projection image corresponding to the free-form surface of the corresponding screen 202.

With reference to FIG. 9, the scanning projector 100 includes a memory 120, an interface 135, the scanner 240, the processor 170, the light source driving unit 185, a power supply unit (or power supply) 190, the light source unit 210, and the optical system 220. The scanning projector 100 may output a projection image and light in a time of flight (TOF) manner. The memory 120 may store a program for processing and control through the processor 170 or temporarily store input or output data, for example, still image and moving picture data. Further, according to embodiments, the memory 120 may include a frame buffer to store a part of input or output data.

The interface 135 may serve as an interface with all external devices connected to the scanning projector 100 by wire or wirelessly. The interface 135 may receive data or power from such an external device and transmit the received data or power to the respective elements within the scanning projector 100. And the interface 135 may transmit data within the scanning projector 100 to an external device.

The scanner 240 may be a device that executes scanning horizontally/vertically so that beams emitted from the light source unit 210, for example, laser diodes, are concentrated onto an image. The scanner 240 may sequentially and repeatedly execute scanning in the first direction and scanning in the second direction using input light and then output light to the outside.

The scanner 240 may sequentially and repeatedly execute scanning from left to right and scanning from right to left with respect to an external scan area, thus executing scanning of the entirety of the external scan area in frame units. Through such scanning, the scanner 240 may output a projection image based on visible light to the external scan area.

By using the 2D scanner 240 which may sequentially execute scanning in the first direction and scanning in the second direction, a plurality of scanners is not necessary and, thus, the scanning projector 100 may be small in size. Further, manufacturing costs of the scanning projector 100 may be reduced.

The scanner 240 may equally scan continuous frames. That is, the scanner 240 may scan the respective frames along the same trajectory based on the same vertical and horizontal driving waveforms. The scanner 240 may be a micro-electro-mechanical system (MEMS) scanner.

The processor 170 may control the overall operation of the scanning projector 100. In more detail, the processor 170 may control operation of the respective units in the scanning projector 100. The processor 170 may receive image video data and vertical synchronous signals of video data, and control the overall operation of the scanning projector 100 to display an image.

The processor 170 may output a video image stored in the memory 120 or a video image received from the outside through the interface 135 to the external scan area as a projection image. For this purpose, the processor 170 may control the light source driving unit 185 which controls the light source unit 210 outputting visible light, such as R, G and B light. In more detail, the processor 170 may output R, G and B signals, corresponding to a video image to be displayed, to the light source driving unit 185.

The processor 170 may control the operation of the scanner 240. In more detail, the processor 170 may control the scanner 240 so as to sequentially and repeatedly execute scanning in the first direction and scanning in the second direction and to output light to the outside.

According to embodiments, the scanning projector 100 may further include a scanner driving unit or module 145 to drive the scanner 240, and the processor 170 may control the scanner driving unit 145 to control the scanner 240. The scanner driving unit 145 may include a sinusoidal wave generation circuit, a triangular wave generation circuit, a signal combination circuit and the like. The scanner driving unit 145 may generate driving frequencies to drive the scanner 240 according to a received scanner driving signal. And the scanner 240 may be driven horizontally and vertically according to the horizontal and vertical driving frequencies and project light on the screen 202, thus forming an image on the screen 202.

The scanner driving unit 145 may drive the scanner 240 such that scanning in the horizontal direction is executed in a sinusoidal waveform and scanning in the vertical direction is executed in a sawtooth waveform. The scanner driving unit 145 may generate a driving signal of the MEMS scanner 240. And the scanner driving unit 145 may sense motion of the scanner 240 and control a driving algorithm according to embodiments.

The light source unit 210 may include a blue light source to emit a single wavelength of blue light, a green light source to emit a single wavelength of green light, and a red light source to emit a single wavelength of red light. The respective colored light sources may include laser diodes. Otherwise, the respective colored light sources may include LEDs. The light source unit 210 in accordance with the embodiments may include a plurality of color light sources, and at least one color light source may be two or more in number.

The light source driving unit 185 may control the red light source part or module, the green light source part or module and the blue light source part or module so as to emit red light, green light and blue light corresponding to R, G and B signals received from the processor 170. Further, the light source driving unit 185 may execute current modulation of laser diodes under control of the processor 170.

The light source driving unit 185 may drive the two or more same color light sources at different on/off timings. If the same color light sources are simultaneously turned on, light emitted from at least one light source may be projected on an area other than the projection area and it may be difficult to execute scanning on the projection area in which an image will be displayed at the same timing. Therefore, by adjusting on/off timing of one or more light source, power consumption may be reduced and a more accurate scanning operation may be carried out.

The light source driving unit 185 may drive, among the two or more same color light sources, one light source so as to be turned on and off earlier than the remaining light sources. That is, the light source driving unit 185 may drive, among the two or more same color light sources, one light source such that turning-on/off of the light source is delayed as compared to the remaining light sources. The power supply unit 190 may receive external power or internal power under control of the processor 170 and supply power necessary to operate the respective elements.

Figure 10:
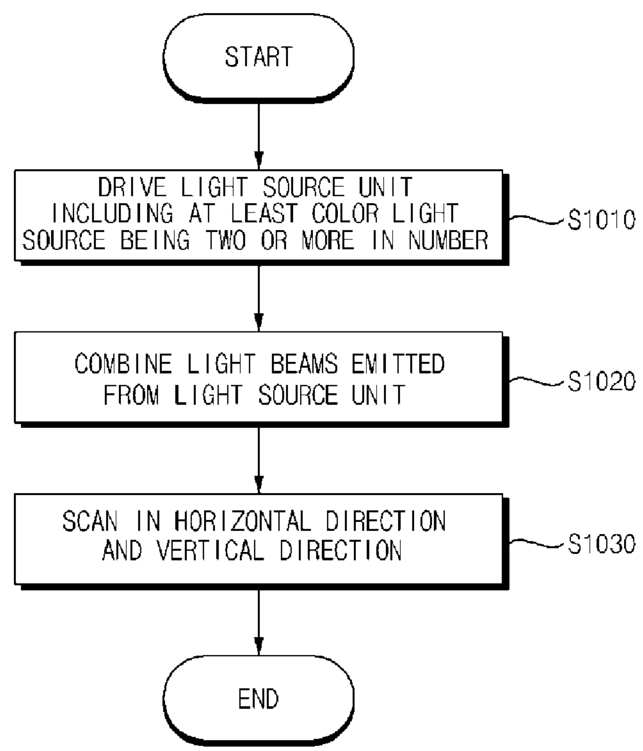
FIG. 10 is a flowchart illustrating operation of a scanning projector in accordance with one embodiment.
Figure 11:
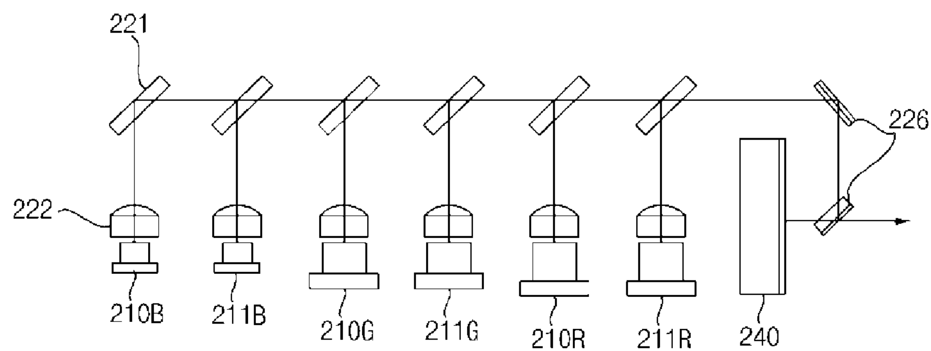
FIG. 11 illustrates various configurations of a light source unit in accordance with embodiments.
Figure 11:
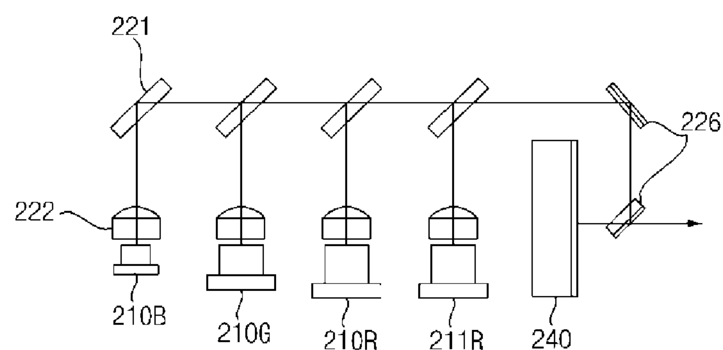
Figure 11:
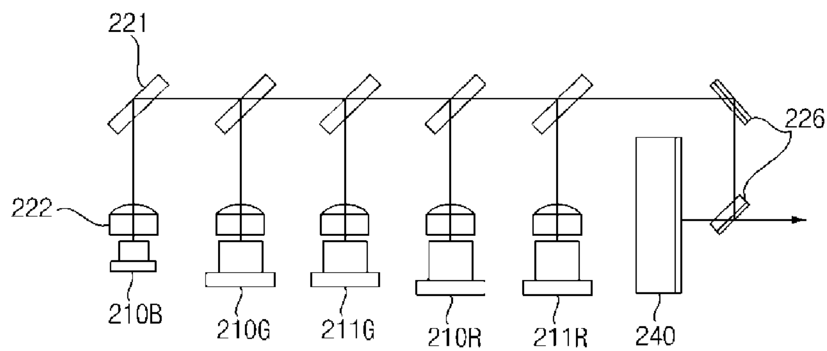

FIG. 10 is a flowchart illustrating operation of a scanning projector in accordance with an embodiment. FIGS. 11(*a*) to 19 are reference views to illustrate a scanning projector and a method for operating the same in accordance with an embodiment.

With reference to FIG. 10, the light source driving unit 185 may drive the light source unit 210 including a plurality of color light sources, among the color light sources, at least one color light source being two or more in number (S1010). Further, the optical system 220 may combine light beams emitted from the light source unit 210 (S1020). The light source unit 210 may be driven by an electrical signal from the light source driving unit 185. Such an electrical signal from the light source driving unit 185 may be generated under control of the processor 170.

The scanning projector 100 may include a plurality of color light sources and, among the color light sources, at least one color light source may be two or more in number. Light beams emitted from the light source unit 210 may be incident upon the scanner 240 via the optical system 220, such as the collimating lenses 222, the light combining units 221, and the light reflection unit 226. That is, the light source unit 210 may include two or more same color light sources.

FIGS. 11(*a*) to 11(*c*) are views illustrating various configurations of the light source unit. For example, with reference to FIG. 11(*a*), the light source unit 210 may include two red laser diodes 210R and 211R, two green laser diodes 210G and 211G, and two blue laser diodes 210B and 211B. In this case, the light source unit 210 may include a first light source part 210R, 210G and 210B and a second light source part 211R, 211G and 211B.

As shown in FIG. 11(*a*), the collimating lenses 222 and the light combining units 221 may be provided so as to correspond to the number and positions of the light sources. With reference to FIG. 11(*b*), the light source unit 210 may include two red laser diodes 210R and 211R, one green laser diode 210G and one blue laser diode 210B. As shown in FIG. 11(*b*), the collimating lenses 222 and the light combining units 221 may be provided so as to correspond to the number and positions of the light sources.

With reference to FIG. 11(*c*), the light source unit 210 may include two red laser diodes 210R and 211R, two green laser diodes 210G and 211G and one blue laser diode 210B. As shown in FIG. 11(*c*), the collimating lenses 222 and the light combining units 221 may be provided so as to correspond to the number and positions of the light sources. According to embodiments, optical parts, such as birefringent elements to separate a laser beam into a plurality of partial beams, beam splitters and the like, may be provided in addition to the structures shown in FIGS. 11(*a*) to 11(*c*). Thereby, beams may be projected on different positions on the screen.

FIGS. 11(*a*) to 11(*b*) are exemplary and embodiments are not limited thereto. For example, the number of light sources and the positions of the light sources may be changed according to design specifications. Further, laser diodes to emit light of the same color may emit light of different wavelengths A laser light source has advantages, such as high photoelectron conversion efficiency and high directivity. However, the laser light source may cause speckling or hot spot speckling, which is a kind of interference fringe, on a screen due to high coherence. The scanning projector in accordance with one embodiment may include same color light sources such that the light sources emit light of different wavelengths, thus removing coherence and reducing speckling.

The two or more same color light sources may be separated from each other so that projected light beams are parallel with each other. That is, the two or more laser diodes that emit light of the same color may be provided such that the laser diodes output beams in parallel and, along a trajectory being parallel with at least a partial section of the scanning trajectory of one laser diode, another laser diode executes scanning.

Further, the laser diodes to emit light of the same color output beams may be provided such that the laser diodes output beams along the same trajectory in at least a partial region. The two or more same color light sources may be aligned such that projected light beams differ from each other by 1 pixel on the screen. The light source unit 210 may further include one or more same color light sources as one of the light sources and increase the number of corresponding laser beams, thus acquiring an image having enhanced brightness.

The scanner 240 may execute scanning in the horizontal direction and in the vertical direction using the combined light beams (S1030). In this case, the two or more same color light sources may output light to different positions within one frame. That is, the two or more same color light sources may be provided such that the laser diodes output beams in parallel, and another laser diode executes scanning along a trajectory being parallel with at least a partial section of the scanning trajectory of one laser diode, and thus, the laser diodes may output laser beams to different positions within one frame.

The scanning projector 100 in accordance with one embodiment may include light sources of the light source unit 210 to emit light of the same color such that the light sources emit light of different wavelengths, thus removing coherence and reducing speckling. The processor 170 or the scanner driving unit 145 may allow scanning in the horizontal direction to be executed in a sinusoidal waveform and scanning in the vertical direction to be executed in a sawtooth waveform. Further, the processor 170 or the scanner driving unit 145 may control the scanner 240 to equally scan a continuous frame.

Figure 12A:
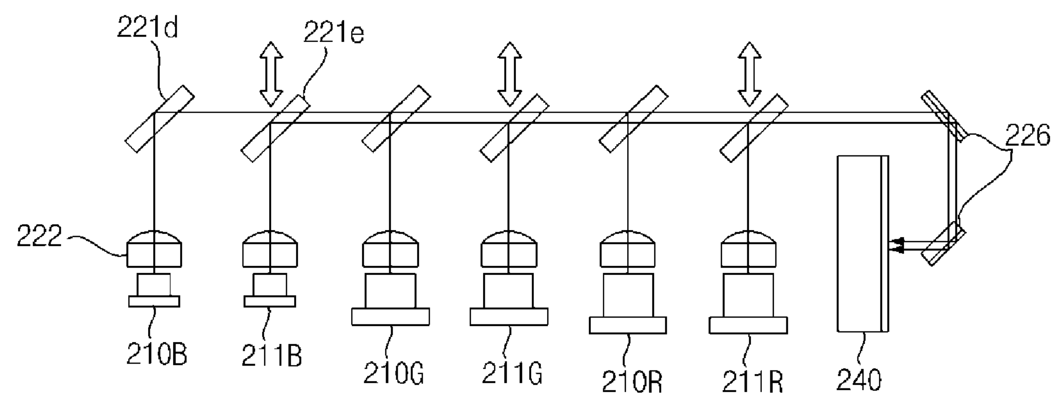
FIG. 12A is a view illustrating a configuration of a light source unit and an optical system in accordance with one embodiment.
Figure 12B:
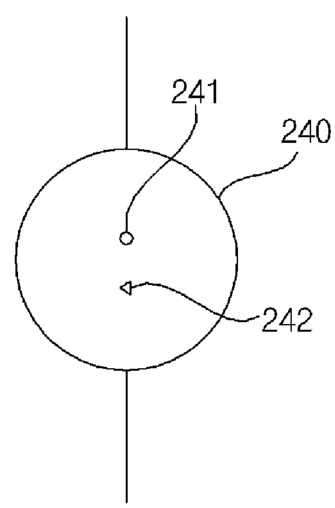
FIG. 12B is a view illustrating positions on a scanner, at which light beams are reflected, in accordance with one embodiment.

FIG. 12A is a view illustrating a configuration of the light source unit and the optical system in accordance with an embodiment, and FIG. 12B is a view illustrating positions on the scanner, at which light beams are reflected, in accordance with an embodiment.

With reference to FIG. 12A, the light source unit 210 may include two red laser diodes 210R and 211R, two green laser diodes 210G and 211G and two blue laser diodes 210B and 211B. In this case, the light source unit 210 may be composed of a first light source or light source part 210R, 210G and 210B and a second light source or light source part 211R, 211G and 211B. The collimating lenses 222 and the light combining units 221*d* and 221*e* may be provided so as to correspond to the number and positions of the light sources.

The light combining units 221*d* and 221*e* may be aligned such that light beams emitted from the first light source part 210R, 210G and 210B and light beams emitted from the second light source part 211R, 211G and 211B are projected on different positions of the screen. For example, the light combining units 221 are not provided in parallel, as shown in FIG. 11(*a*), and the light combining units 221*e* corresponding to the second light source part 211R, 211G and 211B may be provided so as to be shifted closer to the corresponding light sources or farther from the corresponding light sources than the light combining units 221*d* corresponding to the first light source part 210R, 210G and 210B. On the contrary, the light combining units 221*d* corresponding to the first light source part 210R, 210G and 210B may be provided so as to be shifted farther from the corresponding light sources than the light combining units 221*e*.

With reference to FIG. 12B, light beams emitted from the first light source part 210R, 210G and 210B and light beams emitted from the second light source part 211R, 211G and 211B may be reflected at different positions 241 and 242 on a reflection surface of the scanner 240. Light beams reflected at the first position 241 and light beams reflected at the second position 242 may be projected on different positions on the screen. By positioning the light combining units 221*d* and 221*e* such that the scanning positions of light beams emitted from the first light source part 210R, 210G and 210B and light beams emitted from the second light source part 211R, 211G and 211B on the screen differ from each other by 1 pixel, uniformity in scanning may be raised.

Figure 13:
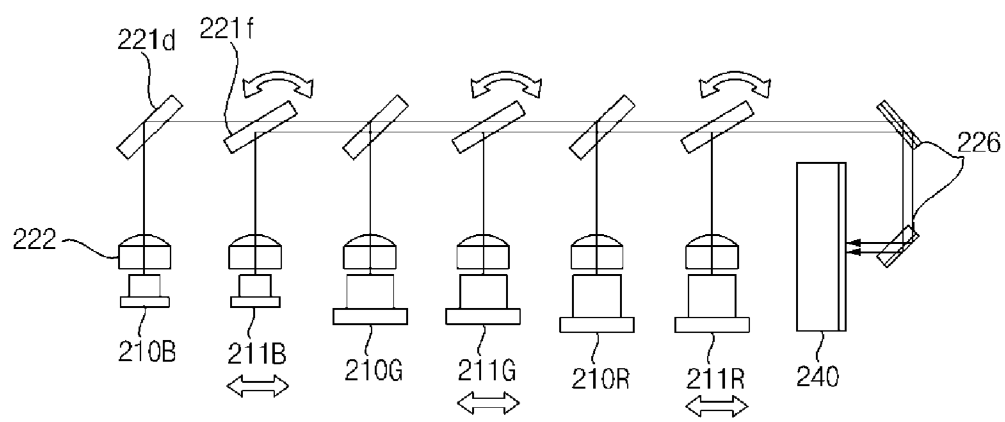
FIGS. 13 and 14 are views illustrating configurations of a light source unit and an optical system in accordance with embodiments.

FIG. 13 is a view illustrating a configuration of the light source unit and the optical system in accordance with an embodiment. With reference to FIG. 13, the light combining units 221 are not provided in parallel, and light combining units 221*f* corresponding to the second light source part 211R, 211G and 211B may be provided so as to be rotated by a designated angle with respect to light combining units 221*d* corresponding to the first light source part 210R, 210G and 210B.

As shown in FIG. 13, the position of the second light source part 211R, 211G and 211B may be adjusted corresponding to rotation of the light combining units 221*f*. Thereby, light beams emitted from the first light source part 210R, 210G and 210B and light beams emitted from the second light source part 211R, 211G and 211B may be projected on different positions on the screen. The light beams may also be reflected at different positions of the reflection surface of the scanner 240.

The light combining units 221*d* or the light combining units 221*f* may be rotated with respect to 3 axes. Therefore, according to embodiments, the light combining units 221*d* or the light combining units 221*f* may be properly rotated with respect to 3 axes so that light beams emitted from the first light source part 210R, 210G and 210B and light beams emitted from the second light source part 211R, 211G and 211B may be projected on different positions on the screen. In this case, the positions of the light sources may not be changed.

Figure 14:
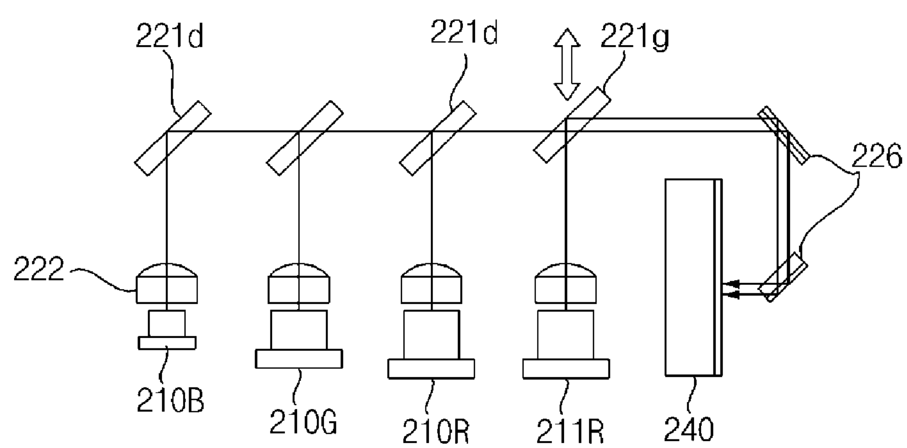

FIG. 14 is a view illustrating a configuration of the light source unit and the optical system in accordance with another embodiment. With reference to FIG. 14, the light source unit 210 may include two red laser diodes 210R and 211R, one green laser diode 210G and one blue laser diode 210B, and collimating lenses 222 and light combining units 221*d* and 221*g* may be provided so as to correspond to the number and positions of the light sources.

The light combining units 221*d* and 221*g* may be aligned so that light beams emitted from the first red light 210R and light beams emitted from the second red light 211R may be projected on different positions on the screen. As shown in FIG. 14, the light combining unit 221*g* corresponding to the second red light source 211R may be provided so as to be shifted closer to the corresponding light source 211R or farther from the corresponding light source 211R than the light combining unit 221*d* corresponding to the first red light source 210R. On the contrary, the light combining unit 221*d* corresponding to the first red light source 210R may be provided so as to be shifted from the light combining units 221*d*.

According to embodiments, optical parts, such as birefringent elements to separate a laser beam into a plurality of partial beams, beam splitters and the like, may be added to the structure illustrated in FIG. 14. Thereby, light beams emitted from one green laser diode 210G and light beams emitted from one blue laser diode 210B may be projected on all positions on which light beams emitted from the first red light source 210R and light beams emitting from the second red light source 211R are projected.

Figure 15A:
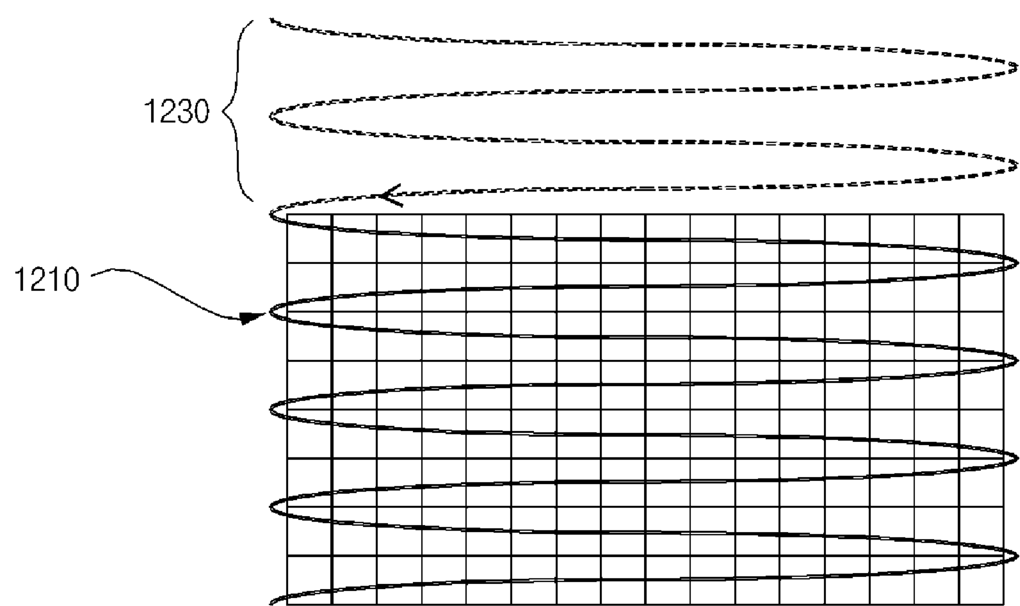
FIGS. 15A to 15C are views illustrating vertical sweep and horizontal sweep of a scanner in accordance with one embodiment.
Figure 15B:
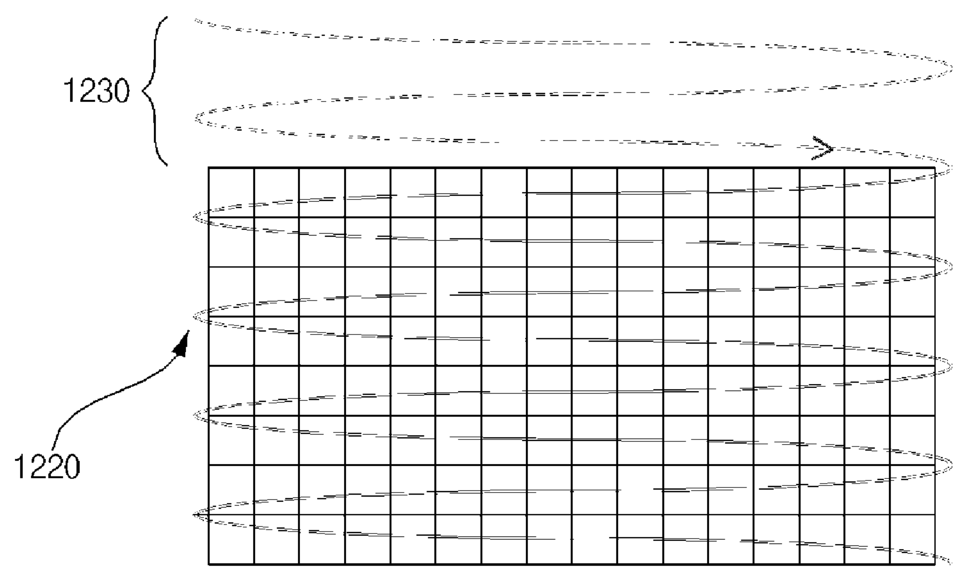
Figure 15C:
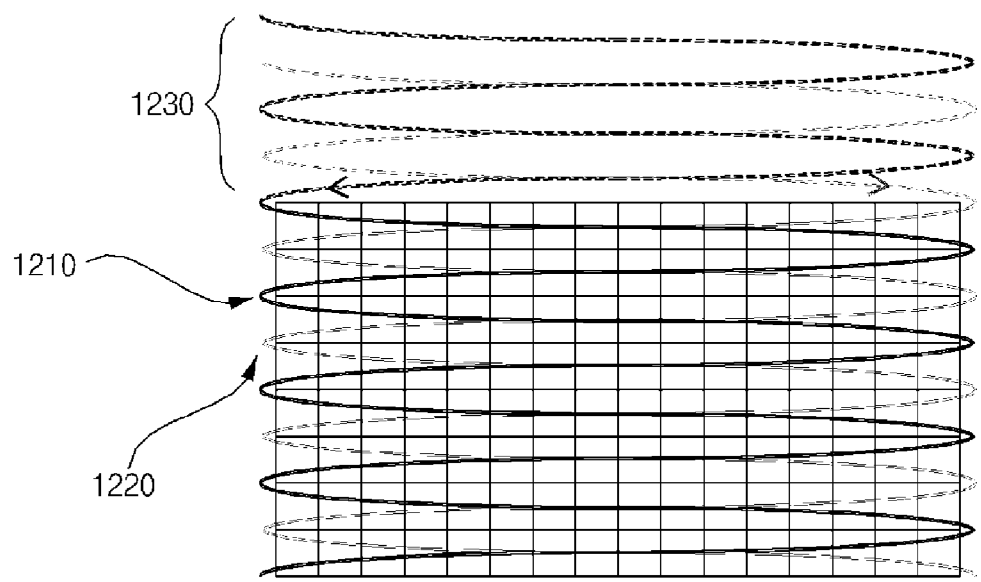
Figure 16:
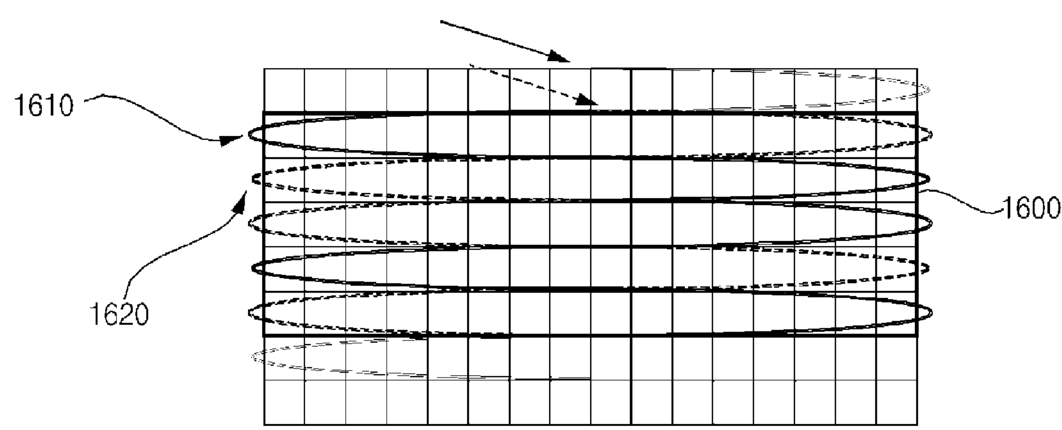
FIG. 16 is a view illustrating vertical sweep and horizontal sweep of a scanner in accordance with one embodiment.
Figure 17:
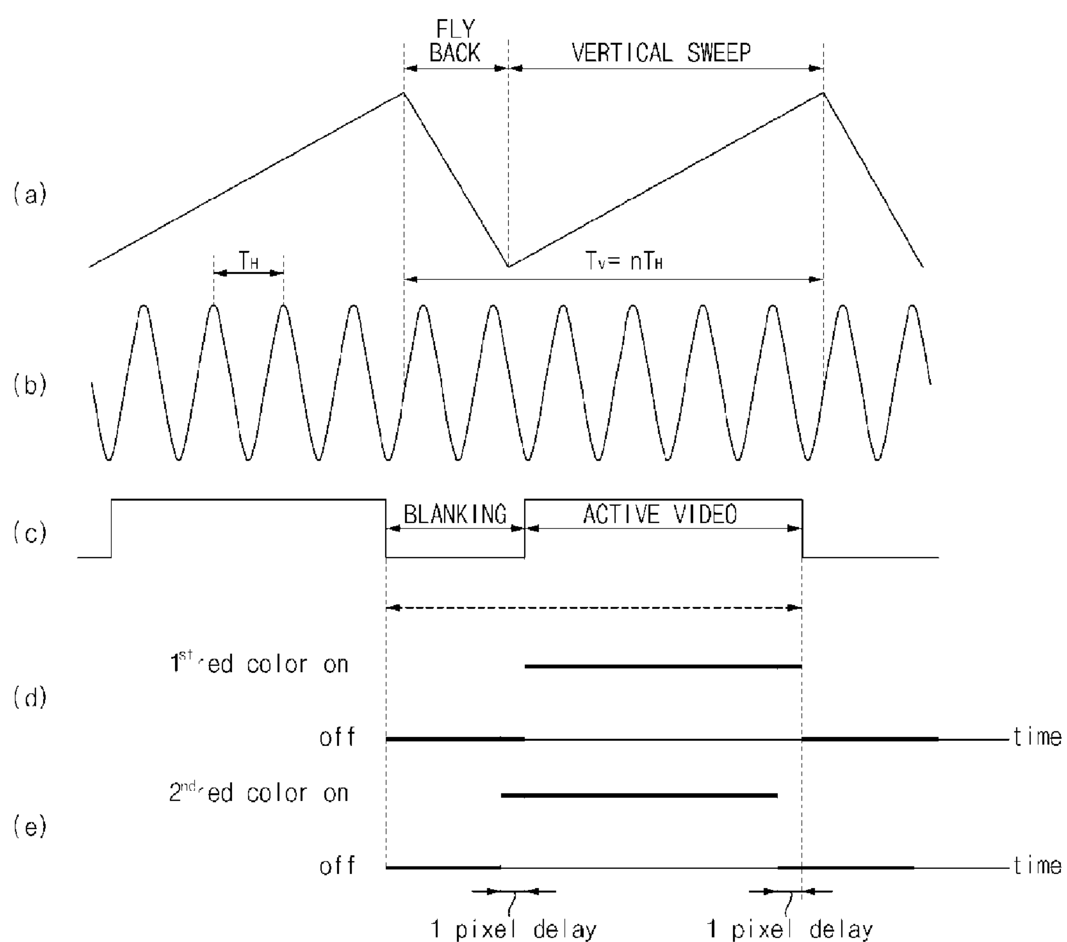
FIG. 17 illustrates driving signal waveforms of a scanning projector in accordance with one embodiment.

FIGS. 15A to 15C and FIG. 16 are views illustrating vertical sweep and horizontal sweep of a scanner in accordance with embodiments, and FIGS. 17(*a*) to 17(*e*) are views illustrating driving signal waveforms of a scanning projector in accordance with one embodiment. With reference to the drawings, the scanner 240 executes vertical sweep and horizontal sweep according to driving signal waveforms, executes image scanning from the initial pixel position to the final pixel position, and repeats such a scanning process. With reference to FIGS. 17(*a*) to 17(*e*), the processor 170 or the scanner driving unit 145 may control the scanner 240 such that the scanner 240 is operated in a ramp waveform, for example, a sawtooth waveform, in the vertical direction and operated in a sinusoidal waveform in the horizontal direction.

FIG. 17(*a*) illustrates a vertical sawtooth waveform having a vertical period TV, FIG. 17(*b*) illustrates a horizontal sinusoidal waveform having a horizontal period TH. FIG. 17(*c*) illustrates an active video section in which an image is scanned and a blanking section in which no image is displayed.

The scanner 240 may execute linear sweep in the vertical direction while scanning an image along the vertical sawtooth waveform having the vertical period TV. The scanner 240 may execute sinusoidal sweep in the horizontal direction at a sweep frequency (1/TH) while scanning an image along the sinusoidal waveform having the horizontal period TH. The light source unit 210 of the scanning projector 100 may include at least two or more of the same color light source.

FIG. 15A illustrates scanning of a first red light source in one frame, FIG. 15B illustrates scanning of a second red light source in one frame, and FIG. 15C illustrates scanning of a first red light source and a second red light source in one frame.

With reference to FIGS. 15A to 15C, if two red light sources are provided, scanning using the first red light source 1210 and scanning using the second red light source 1220 in one frame are executed at different positions on a screen. Scanning using the first red light source 1210 and scanning using the second red light source 1220 may be executed along parallel trajectories. Further, scanning using the first red light source 1210 and scanning using the second red light source 1220 may be executed in parallel by the interval of 1 pixel and, thus, the overall projection area may be uniformly scanned.

As shown in FIG. 15A, scanning using the first red light source 1210 may be executed from right to left on odd-numbered lines and executed from left to right on even-numbered lines. In the same frame, as exemplarily shown in FIG. 15B, scanning using the second red light source 1220 may be executed from left to right on the odd-numbered lines and executed from right to left on the even-numbered lines. Since scanning using the first red light source 1210 and scanning using the second red light source 1220 shown in FIGS. 15A and 15B are executed in one frame, scanning of red light sources in a designated frame may be executed, as shown in FIG. 15C. In one frame, light beams emitted from the same color light sources are projected on different positions and are combined, and thus, uniform scanning may be carried out.

Further, as shown in FIGS. 15A to 15C, scanning using the first red light source 1210 and scanning using the second red light source 1220 may be equally carried out in continuous frames. That is, while scanning in continuous frames, scanning with the same phase may be executed without change of the phase.

The light source driving unit 185 may drive the two or more same color light sources at different on/off timings. If the same color light sources are simultaneously turned on, light emitted from at least one light source may be projected on an area other than the projection area. Therefore, the light source driving unit 185 may adjust on/off timing of one or more light sources, thus reducing power consumption and executing a more accurate scanning operation. The light source driving unit 185 may drive, among the two or more same color light sources, one light source so as to be turned on and off earlier than the remaining light sources. That is, the light source driving unit 185 may drive, among the two or more same color light sources, one light source such that turning-on/off of the color light source is delayed as compared to the remaining light sources. If two red light sources are provided, FIG. 17(*d*) illustrates on/off timing of the first light source and FIG. 17(*e*) illustrates on/off timing of the second light source. With reference to FIGS. 17(*d*) and 17(*e*), within one frame, the second red light source may be turned on earlier in the blanking section and turned off earlier in the active video section.

In the case of vertical sweep and horizontal sweep of the scanner 240 exemplarily shown in FIGS. 15A to 15C, scanning using the second red light source 1220 may enter the upper end of the right region of the projection area earlier and, thus, the second light source may be turned on earlier. In a section shown by a solid line in FIGS. 15A to 15C, both the first and second red light sources may be turned on. In a 1230 section outside the projection area, shown by a dotted line in FIGS. 15A to 15C, the light sources may be turned off.

In the case of vertical sweep and horizontal sweep of the scanner 240 shown in FIGS. 15A to 15C, scanning using the second red light source 1220 may enter the projection area, in which an image will be displayed, earlier, and exit from the projection area earlier, and thus, the second red light source may be turned off earlier. On/off timings of the first red light source and the second red light source may have a delay time difference of 1 pixel. Thereby, all pixels within the projection area may be uniformly scanned without omission.

In accordance with the embodiments described herein, scanning using a first light source to emit light of the same color and scanning using a second light source to emit light of the same color in one frame are executed at different positions on a screen. However, scanning trajectories shown in FIGS. 15A to 15C are exemplary and the embodiments are not limited thereto. For example, as shown in FIG. 16, scanning using a first light source to emit light of the same color and scanning using a second light source to emit light of the same color in one frame are executed at different positions on a screen but positions thereof to enter a projection area 1600, in which an image will be formed, may be changed. On/off timings of the first light source to emit light of the same color and the second light source to emit light of the same color and positions thereof to scan designated pixels may be changed.

In accordance with one embodiment, the light sources may be turned off not only at the upper and lower sides of the projection area 1600 but also at the left and right sides of the projection area 1600. That is, the light sources may be turned off when they deviate from the projection area 1600, in which an image will be formed, in the horizontal direction. Thereby, power consumption may be reduced and an image may be accurately formed without distortion to raise stability in driving.

In the case of driving of the scanner described with reference to FIGS. 15A to 15C, 16 and 17(*a*) to 17(*e*), occurrence of the region 410 in which the scanning beams are densely disposed between the pixels and the region 420 in which the scanning beams are sparsely disposed between the pixels, shown in FIG. 4, may be prevented and uniform scanning may be achieved. Further, in the case of driving of the scanner described with reference to FIGS. 5 to 7, images of both ends 711 and 712 of the screen may flicker or flow down due to repetition of turning-on/off. In order to execute uniform scanning, two continuous frames are used, and thus, a processing speed and resolution may be lowered as compared to when one frame is used.

Further, same color light sources may be used in one frame to execute scanning, and thus, a processing speed may be raised. Moreover, a clear image having high resolution may be formed without distortion. Same color light sources may also be configured to emit light of different wavelengths, thus removing speckling.

Figure 18:
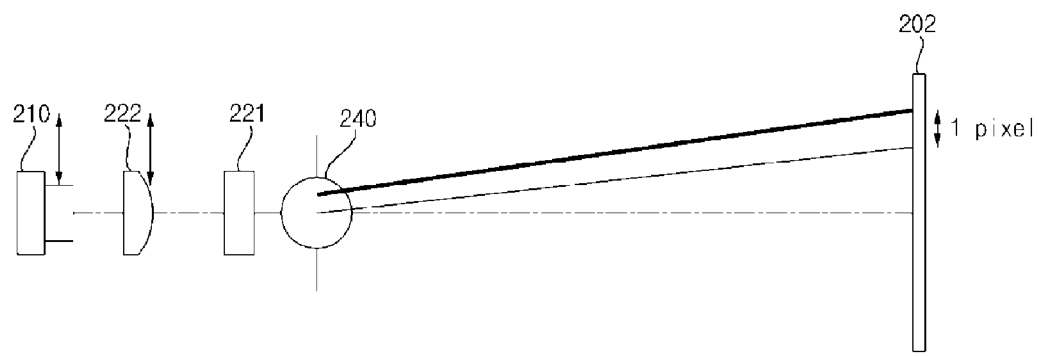
FIGS. 18 and 19 are reference views to illustrate a scanning projector and a method for operating the same in accordance with one embodiment.
Figure 19:
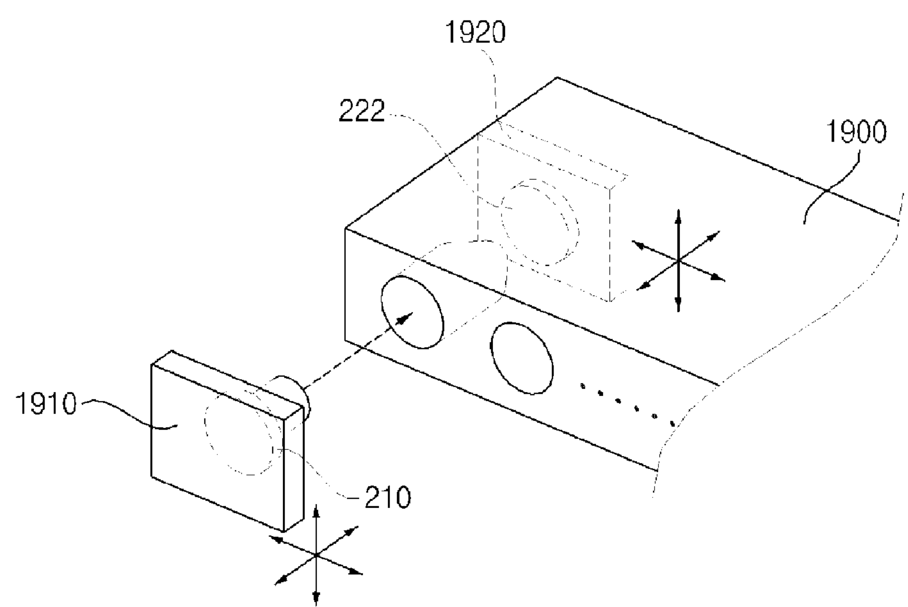

FIGS. 18 and 19 are reference views to illustrate a scanning projector and a method for operating the same in accordance with one embodiment. Two or more same color light sources and two or more collimating lenses corresponding thereto may be aligned such that projected light beams differ from each other on a screen by 1 pixel.

With reference to FIG. 18, in order to align light sources 210 or the collimating lenses 222 by a difference of +/−1 pixel, the light sources 210 or the collimating lenses 222 may be moved upward/downward. When the light source 210 or the collimating lens 222 is moved by a designated distance in the y-axis direction, the position of corresponding light beams on a screen 202 may be adjusted. With reference to FIG. 19, a holder 1910 of a laser light source 210 and a holder 1920 of a lens 222 of an optical engine 1900 may be moved and/or rotated with respect to 3 axes. Therefore, by moving and/or rotating the holder 1910 of the laser light source 210 and the holder 1920 of the lens 222, +/−1 pixel alignment on the screen may be carried out.

In accordance with an embodiment, the scanning projector may form a uniform image and improve image quality, thus displaying an image of high resolution without distortion. The scanning projector may remove flowing down of both ends of an image, thus enhancing overall image quality.

A scanning projector and a method for operating a scanning project are not limited to the above-described embodiments and all or parts of the respective embodiments may be selectively combined so that various modifications, additions and substitutions are possible.

A method of operating a scanning projector in accordance with one embodiment may be implemented as code readable by a processor provided in a recording medium readable by the processor. The recording medium readable by the processor may be any kind of recording device in which data readable by the processor are stored. For example, the recording medium readable by the processor may include a ROM, a RAM, a CD-ROM, a magnetic tape, a floppy disk, and an optical data storage medium. Further, the medium readable by the processor may include a carrier wave, such as data transmission over the Internet. Further, since the recording medium readable by the processor may be distributed to computer systems connected through a network, code readable by the processor in a distributed manner may be stored and executed.

In accordance with at least one embodiment, light beams emitted from same color light sources are projected on different positions on a screen within one frame and more rapid and effective scanning may be executed. In accordance with at least one embodiment, a clear image having high resolution may be formed. In accordance with at least one embodiment, uniform scanning may be executed, and thus, image quality may be improved and a high-quality image without distortion may be displayed.

A scanning projector which may improve image quality and display a clear image, and a method for operating a scanning projector are provided. A scanning projector may rapidly and accurately generate an image of a high resolution.

A scanning projector according to an embodiment includes a light source unit including a plurality of color light sources including at least one color light source being two or more in number, and a scanner configured to execute scanning in the horizontal direction and the vertical direction using light beams emitted from the light source unit, wherein light beams emitted from the two or more same color light sources are projected on different positions on a screen within one frame.

A method for operating a scanning projector includes driving a light source unit including a plurality of color light sources including at least one color light source being two or more in number, and executing scanning in the horizontal direction and the vertical direction through a scanner using light beams emitted from the light source unit, wherein light beams emitted from the two or more same color light sources are projected on different positions on a screen within one frame.

A scanning projector includes a light source unit including a first light source part including a plurality of color light sources and a second light source part including one or more same color light sources as at least one of the color light sources, and a scanner configured to execute scanning in the horizontal direction and the vertical direction using light beams emitted from the light source unit, wherein light beams emitted from the first light source part and light beams emitted from the second light source part are projected on different positions on a screen within one frame.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A projector comprising:

a light source module having a plurality of light sources, wherein each light source emits a light of a different color and at least one of the light sources includes a plurality of light emitting elements emitting same color light beams; and a scanner configured to execute scanning in a horizontal direction and a vertical direction using light beams emitted from the light source module, wherein same color light beams emitted from the light emitting element are projected onto different positions of a screen within one frame, and wherein the light emitting elements are aligned such that projected same color light beams differ from each other by one pixel on the screen.

2. The projector according to claim 1, wherein the same color light beams emitted from the light emitting elements are reflected at different positions of the scanner within one frame.

3. The projector according to claim 1, wherein the scanner scans continuous frames in the same manner using the light beams emitted from the light source module.

4. The projector according to claim 1, wherein the light source module includes red, green and blue laser diodes.

5. The projector according to claim 1, further including collimating lenses provided in front of the light source module to convert the light beams emitted from the light source module into parallel light beams.

6. The projector according to claim 5, wherein the collimating lenses are aligned such that projected same color light beams differ from each other by 1 pixel on the screen.

7. The projector according to claim 1, wherein turning-on/off of one of the light emitting elements is delayed as compared to the remaining light emitting elements.

8. The projector according to claim 1, further including light combining devices to combine the light beams emitted from the light source module.

9. The projector according to claim 1, further including:

a light source driver configured to drive the light source module; and a scanner driver configured to control scanning of the scanner in the horizontal direction and scanning of the scanner in the vertical direction.

10. The projector according to claim 9, wherein the light source driver drives the light source module such that turning-on/off of one of the light emitting elements is delayed as compared to the remaining light emitting elements.

11. The projector according to claim 9, wherein the scanner driver drives the scanner such that scanning of the scanner in the horizontal direction is executed along a sinusoidal waveform and scanning of the scanner in the vertical direction is executed along a sawtooth waveform.

12. A method for operating a projector, comprising:

driving a light source module having a plurality of light sources wherein each light source emits a light of a different color from the other light sources and at least one of the light sources includes a plurality of light emitting elements emitting same color light beams; and executing scanning in a horizontal direction and a vertical direction through a scanner using light beams emitted from the light source module, wherein same color light beams emitted from the light emitting elements are projected on different positions of a screen within one frame, and wherein the same color light beams emitted from the light emitting elements differ from each other by one pixel on the screen.

13. The method according to claim 12, wherein the same color light beams emitted from the light emitting elements are reflected at different positions of the scanner within one frame.

14. The method according to claim 12, further including executing scanning of continuous frames in the same manner.

15. The method according to claim 12, wherein the light source module is driven such that turning-on/off of one of the light emitting elements is delayed as compared to the remaining light emitting elements.

16. The method according to claim 12, wherein scanning of the scanner in the horizontal direction is executed along a sinusoidal waveform and scanning of the scanner in the vertical direction is executed along a sawtooth waveform.

17. The method according to claim 12, further including combining the light beams emitted from the light source module.

* * * * *